US010919398B2

United States Patent
Higaki et al.

(10) Patent No.: US 10,919,398 B2
(45) Date of Patent: Feb. 16, 2021

(54) VEHICLE CONTROL SYSTEM

(71) Applicant: HONDA MOTOR CO., LTD., Tokyo (JP)

(72) Inventors: Tomohiro Higaki, Wako (JP); Yoshimichi Tsubata, Wako (JP); Kazuto Yamane, Wako (JP); Daijiro Yoshinari, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 11 days.

(21) Appl. No.: 16/279,192

(22) Filed: Feb. 19, 2019

(65) Prior Publication Data

US 2019/0255955 A1 Aug. 22, 2019

(30) Foreign Application Priority Data

Feb. 19, 2018 (JP) ................................. 2018-026736

(51) Int. Cl.
*B60L 15/20* (2006.01)
*B60L 50/60* (2019.01)
(Continued)

(52) U.S. Cl.
CPC ............. *B60L 15/20* (2013.01); *B60L 50/66* (2019.02); *B60L 58/10* (2019.02); *B60Q 1/50* (2013.01);
(Continued)

(58) Field of Classification Search
CPC .......... B60L 15/20; B60L 50/66; B60L 58/10
See application file for complete search history.

(56) References Cited

U.S. PATENT DOCUMENTS

| 6,513,492 B1 * | 2/2003 | Bauerle ..................... F02D 9/02 123/396 |
| 2015/0051771 A1 * | 2/2015 | Greenwood ............ B60L 58/12 701/22 |

(Continued)

FOREIGN PATENT DOCUMENTS

| JP | 2006-099987 A | 4/2006 |
| JP | 2009-073410 A | 4/2009 |

(Continued)

OTHER PUBLICATIONS

Office Action dated Dec. 17, 2019, issued in counterpart JP Application No. 2018-026736, with English translation. (6 pages)

(Continued)

*Primary Examiner* — Imran K Mustafa
(74) *Attorney, Agent, or Firm* — Westerman, Hattori, Daniels & Adrian, LLP (57) ABSTRACT

A vehicle includes a high voltage battery that stores electric power; a battery box that stores the high voltage battery; a battery disposition section in which the battery box is provided; a power drive unit that controls acceleration and deceleration of an electric vehicle so that a request of a driver is implemented; and a water sensor that detects water in the battery disposition section. In response to detection of water by the water sensor, the power drive unit performs acceleration and deceleration limit control to limit acceleration and deceleration of the electric vehicle so that the acceleration or deceleration rate of the electric vehicle is maintained lower than or equal to a predetermined limited acceleration or deceleration rate.

14 Claims, 3 Drawing Sheets

(51) Int. Cl.
  *B60Q 9/00* (2006.01)
  *B60L 58/10* (2019.01)
  *H01M 10/48* (2006.01)
  *B60Q 1/50* (2006.01)

(52) U.S. Cl.
  CPC .............. *B60Q 9/00* (2013.01); *H01M 10/48* (2013.01); *B60Y 2200/91* (2013.01); *H01M 2220/20* (2013.01)

(56) References Cited

U.S. PATENT DOCUMENTS

| | | | |
|---|---|---|---|
| 2018/0201138 A1* | 7/2018 | Yellambalase | B60L 53/16 |
| 2019/0392697 A1* | 12/2019 | Perez Barrera | G05D 1/0088 |

FOREIGN PATENT DOCUMENTS

| | | |
|---|---|---|
| JP | 2010-220290 A | 9/2010 |
| JP | 2012-119307 A | 6/2012 |
| JP | 2015-081896 A | 4/2015 |
| JP | 2017-171176 A | 9/2017 |
| WO | 2013/061847 A1 | 5/2013 |

OTHER PUBLICATIONS

Office Action dated Sep. 10, 2019, issued in counterpart JP Application No. 2018-026736, with English translation (6 pages).

\* cited by examiner

FIG. 3

VEHICLE CONTROL SYSTEM

CROSS REFERENCES TO RELATED APPLICATIONS

The present application claims priority under 35 U.S.C. § 119 to Japanese Patent Application No. 2018-026736, filed Feb. 19, 2018, entitled "Vehicle Control System." The contents of this application are incorporated herein by reference in their entirety.

TECHNICAL FIELD

The present disclosure relates to a vehicle control system. More particularly, the present disclosure relates to a vehicle control system of a vehicle in which a power storage device container that stores a power storage device is provided in a power storage device disposition section.

BACKGROUND

An electric vehicle, such as a battery electric vehicle (BEV) including a motor as a driving source, and a hybrid electric vehicle (HEV) including a motor and an internal combustion engine as driving sources, includes a high voltage battery. A high voltage battery and a battery case that stores and protects the high voltage battery are provided, for instance, in a luggage compartment on the rear side of the vehicle. Also, when the volume of water outside a vehicle increases due to heavy rain or flood, water may enter the luggage compartment, may further enter the battery case, and the high voltage battery may be exposed to water and damaged. Japanese Unexamined Patent Application Publication No. 2012-119307 discloses a water discharge device that prevents a high voltage battery from being exposed to water.

In the water discharge device of Japanese Unexamined Patent Application Publication No. 2012-119307, a water level sensor is provided in a battery undercover in which a battery module is installed. When the water level in the undercover detected by the water level sensor is greater than or equal to a reference value, the water in the undercover is discharged outside the undercover by driving a water pump.

SUMMARY

The inventors found the followings. Although the water discharge device of Japanese Unexamined Patent Application Publication No. 2012-119307 may prevent the water level in the undercover from exceeding a reference value, water in the undercover may be discharged only after the water level in the undercover reaches the reference value, and the battery module is submerged to some extent. When a vehicle is running, the water level in the undercover varies by acceleration and deceleration of the vehicle. For this reason, the water level may exceed a reference value along with the acceleration and deceleration of the vehicle during the period since the start of operation of the water pump until the water in the undercover is discharged. Thus the high voltage battery may be damaged.

The present application describes a vehicle control system that, even when water enters a battery disposition section in which a battery case is installed, is capable of preventing a high voltage battery in the battery case from being exposed to water.

(1) A vehicle (for instance, the later-described vehicle V) according to one embodiment of the present disclosure includes: a power storage device (for instance, the later-described high-voltage battery 51) that stores electric power; a power storage device container that stores the power storage device (for instance, the later-described battery box 52); a power storage device disposition section (for instance, the later-described battery disposition section 24) in which the power storage device container is provided; an acceleration and deceleration control device (for instance, the later-described power drive unit 3) that controls acceleration and deceleration of a vehicle; and a water sensor (for instance, the later-described water sensor 58) that detects water in the power storage device disposition section. In response to detection of water by the water sensor, the acceleration and deceleration control device performs acceleration and deceleration limit control to limit acceleration and deceleration of the vehicle so that an acceleration or deceleration rate of the vehicle is maintained lower than or equal to a limited acceleration or deceleration rate. Thus, when water enters the power storage device disposition section of a vehicle while running and a water sensor detects the entering of water, the water level of the water accumulated in the power storage device disposition section can be stabilized not to be ruffled. Consequently, it is possible to prevent the water accumulated in the power storage device disposition section from entering the power storage device container due to sudden acceleration and deceleration and to eventually prevent the power storage device stored in the power storage device container from being exposed to water.

(2) In this case, preferably the power storage device disposition section is trough-shaped with a bottom, and the water sensor is installed at a position higher than a bottom surface for instance, the later-described bottom surface 24a) of the power storage device disposition section, and detects water when the water level in the power storage device disposition section exceeds a detection position. In this manner, the vehicle performs acceleration and deceleration limit control according to the water level in the power storage device disposition section, thereby making it possible to perform the acceleration and deceleration limit control at an appropriate timing so that the power storage device is not exposed to water.

(3) In this case, preferably the power storage device container is box-shaped, and the detection position of the water sensor is higher than the bottom surface and lower than an upper end of the power storage device container. Thus, reduction in the drive performance of a vehicle can be prevented, where the reduction may be caused by performing acceleration and deceleration limit control in a situation in which the water level in the power storage device disposition section is sufficiently low and there is no risk of exposure of the power storage device to water. Thus, the acceleration and deceleration limit control can be performed before the water level in the power storage device disposition section reaches the upper end of the power storage device container and water enters the power storage device container.

(4) In this case, preferably when water is detected continuously for a predetermined time or longer by the water sensor, the acceleration and deceleration control device starts the acceleration and deceleration limit control. Thus, acceleration and deceleration limit control can be prevented from accidentally starting in response to temporary exposure of the water sensor to water due to, for instance, acceleration and deceleration of the vehicle even though a sufficient amount of water to cause the high voltage battery to be exposed to water is not accumulated in the power storage device disposition section.

(5) In this case, preferably the limited acceleration or deceleration rate is set so that inclination of a water surface in the power storage device disposition section with respect to a horizontal plane is less than or equal to a predetermined limited angle (for instance, the later-described limit angle α), the inclination being caused when the vehicle is accelerated or decelerated within the limited acceleration or deceleration rate. Thus, it is possible to prevent the angle of the surface of the water in the power storage device disposition section with respect to a horizontal plane from exceeding the limited angle during execution of the acceleration and deceleration limit control. Therefore, it is possible to prevent water from entering the power storage device container due to acceleration and deceleration and to eventually prevent the power storage device from being exposed to water.

(6) In this case, preferably the power storage device container includes a trough body (for instance, the later-described trough body 53) which has a bottom and includes the power storage device, and a lid body (for instance, the later-described lid body 54) which covers an opening edge (for instance, the later-described opening edge 53a) on a vertically upper side of the trough body, the detection position of the water sensor is higher than the bottom surface and lower than the opening edge, and the limited angle is formed by a horizontal plane and the line connecting the detection position of the water sensor and the point (for instance, the later-described point P) which is of the opening edge and farthest away from the detection position. The water accumulated in the power storage device disposition section may enter through an opening edge which is space between the trough body and the lid body. However, with the limited angle, it is possible to reliably prevent the water in the power storage device disposition section from entering the power storage device container through the opening edge due to acceleration and deceleration of the vehicle during execution of the acceleration and deceleration limit control, and to eventually prevent the power storage device from being exposed to water.

(7) In this case, preferably the vehicle further includes an internal notification unit (for instance, the later-described power drive unit 3 and control device 73) that notifies a driver that the acceleration and deceleration limit control is performed before the acceleration and deceleration limit control is performed by the acceleration and deceleration control device. When the acceleration and deceleration limit control is performed, a feeling of strangeness may be felt by a driver because the acceleration and deceleration is limited so that the acceleration or deceleration rate of the vehicle is maintained lower than or equal to the limited acceleration or deceleration rate contrary to a request of the driver. However, with the internal notification unit, a feeling of strangeness felt by a driver due to sudden acceleration and deceleration limit control may be reduced.

(8) In this case, preferably the internal notification unit notifies a driver that the acceleration and deceleration limit control is performed, via at least one of display on a meter recognizable by visual perception of a driver and warning sound or utterance of voice recognizable by auditory perception of the driver. Thus, it is possible to reliably notify a driver that the acceleration and deceleration limit control is performed.

(9) In this case, preferably the vehicle further includes an external notification unit (for instance, the later-described power drive unit 3 and control device 75) that turns on a hazard light flasher (for instance, the later-described hazard light flasher 74) before the acceleration and deceleration limit control is performed by the acceleration and deceleration control device. When the acceleration and deceleration limit control is performed, a feeling of strangeness may be felt by the driver of the following vehicle because the acceleration and deceleration is limited so that the acceleration or deceleration rate of the vehicle is maintained lower than or equal to the limited acceleration or deceleration rate contrary to a request of the driver of the leading vehicle. However, with the external notification unit, a feeling of strangeness felt by the driver of the following vehicle due to sudden acceleration and deceleration limit control may be reduced. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

DETAILED DESCRIPTION

Figure 1:
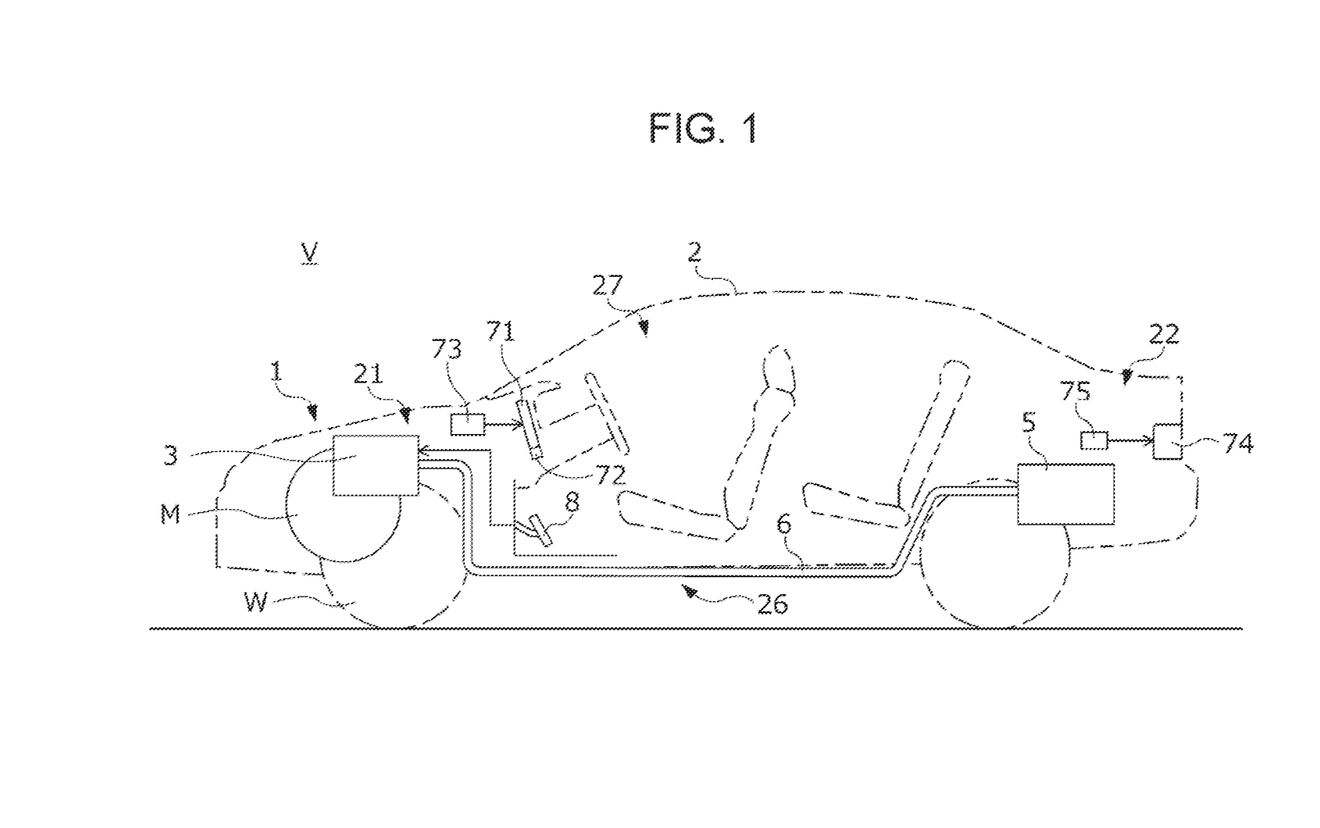
FIG. 1 is a view illustrating the configuration of an electric vehicle including a vehicle control system according to an embodiment of the present disclosure.

Hereinafter, an embodiment of the present disclosure will be described with reference to the drawings. FIG. 1 is a view illustrating the configuration of an electric vehicle V including a vehicle control system 1 according to the embodiment. The electric vehicle V is a BEV including a motor as the driving source of, and the present disclosure is not limited to this. The electric vehicle V may be a HEV including a motor and an internal combustion engine as the driving sources.

The vehicle V includes a motor generator M and a power drive unit 3 provided in an engine compartment 21 of the front part of a vehicle body 2, a high voltage electrical unit 5 provided in a trunk compartment 22 of the rear part of the vehicle body 2, an electric power cable 6 that is disposed in an underfloor unit 26 of the vehicle body 2 and electrically connects the power drive unit 3 and the high voltage electrical unit 5, a display panel 71 and a speaker 72 provided in a driver seat 27 of the vehicle body 2, a control devices 73 for these, a hazard light flasher 74 and a control device 75 provided in the rear part of the vehicle body 2, and an operating pedal 8 provided in the driver seat 27.

The high voltage electrical unit 5 includes a high voltage battery, and a battery case that stores the high voltage battery. It is to be noted that the configuration of the high voltage electrical unit 5 and the detailed configuration of the trunk compartment 22 in which the high voltage electrical unit 5 is provided will be described later with reference to FIG. 2. The electric power cable 6 connects the high voltage battery of the high voltage electrical unit 5 and the power drive unit 3 to provide the electric power stored in the high voltage battery to the power drive unit 3.

The operating pedal 8 includes an accelerator pedal operated by a driver at the time of acceleration, and a brake pedal operated by a driver at the time of deceleration.

The output shaft of the motor generator M is mechanically connected to driving wheels W, and serves as a driving source of the electric vehicle V. The power drive unit 3 includes a voltage transducer (not illustrated) that increases or decreases the voltage of the high voltage battery, an inverter (not illustrated) that converts DC power through the voltage transducer to AC power and supplies the AC power to the motor generator M, and an electronic control unit (not illustrated) that controls the voltage transducer and the inverter according to an operation of the operating pedal 8. The power drive unit 3 obtains an acceleration or deceleration request of a driver for the electric vehicle V via the operating pedal 8, and controls the acceleration and deceleration of the electric vehicle V so that the acceleration or deceleration request is implemented.

The display panel 71 is provided at a position near the driver seat 27, visually recognizable by a driver (not illustrated). The display panel 71 displays various types of information according to a command from the control device 73, and notifies a driver of the various types of information via visual perception. The speaker 72 outputs warning sound and/or voice according to a command from the control device 73. A driver recognizes the warning sound and/or voice outputted from the speaker 72 via auditory perception.

The hazard light flasher 74 is provided at a position of the electric vehicle V of the rear part of the vehicle body 2, the position being visually recognizable by the driver of the following vehicle. The hazard light flasher 74 flashes according to a command from the control device 75. The driver of the following vehicle can recognize that something abnormal has occurred in the electric vehicle V running in front of the following vehicle by visually recognizing flash of the hazard light flasher 74.

Figure 2:
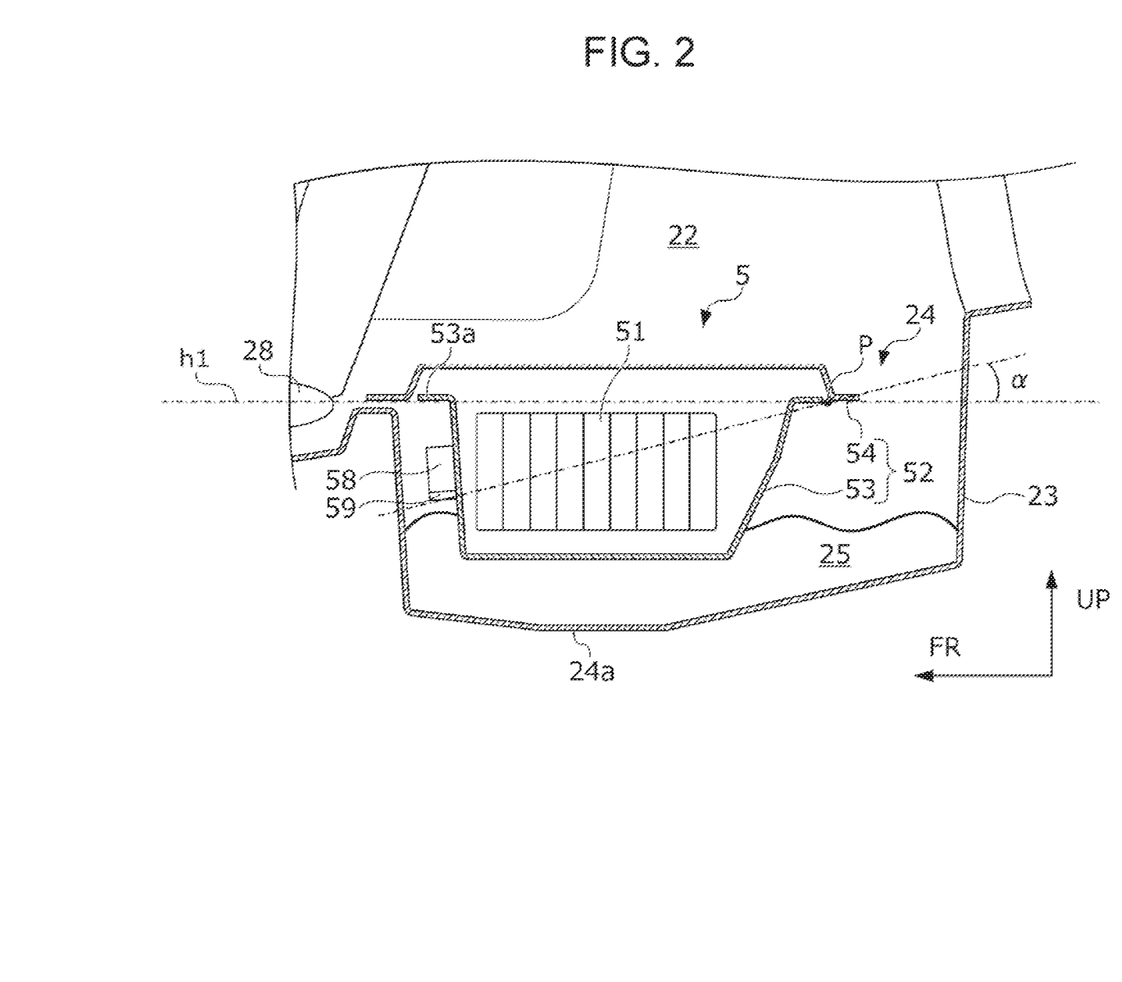
FIG. 2 is a cross-sectional view illustrating the configuration of the lower portion of a trunk compartment.

FIG. 2 is a cross-sectional view illustrating the configuration of the lower portion of the trunk compartment 22. It is to be noted that an arrow FR indicates the forward direction of the vehicle, and an arrow UP indicates the upper direction of the vehicle.

The lower portion of the trunk compartment 22 is partitioned into the trunk compartment 22 and the vehicle exterior by an under-panel 23. As illustrated in FIG. 2, the under-panel 23 has a convex shape toward the vertically lower side. In the lower portion of the trunk compartment 22, a battery disposition section (chamber) 24 in trough-shaped with a bottom is formed by the under-panel 23. Also, the high voltage electrical unit 5 is provided in the battery disposition section 24. Like this, the battery disposition section 24 has a trough shape and is provided in the lower portion of the trunk compartment 22 close to a road surface, thus when heavy rain or flood occurs, water 25 may be accumulated in the battery disposition section 24 as illustrated in FIG. 2.

The high voltage electrical unit 5 includes a high voltage battery 51 that stores electric power, a box-shaped battery box 52 that stores and protects the high voltage battery 51, and a water sensor 58 that, when water is accumulated in the battery disposition section 24 as mentioned above, detects the water.

The high voltage battery 51 includes multiple stacked battery cells and has a cubic shape. The electrodes of the battery cells are connected by a bus bar which is not illustrated. Also, the bus bar of the high voltage battery 51 is connected to the power drive unit 3 via the electric power cable 6 (see FIG. 1).

As illustrated in FIG. 2, the battery box 52 is formed in combination of the trough body 53 with a bottom, in which the high voltage battery 51 is provided, and the lid body 54 which covers an opening edge on a vertically upper side of the trough body 53. The battery box 52 is provided in the battery disposition section 24 so that the opening edge 53a is horizontal, for instance. Also, since slight space between the trough body 53 and the lid body 54 may be formed, the water accumulated in the battery disposition section 24 may enter the battery box 52 through the opening edge 53a.

Waterproof treatment is given to the trough body 53. Therefore, even when the water 25 is accumulated in the battery disposition section 24 as illustrated in FIG. 2, the water 25 does not immediately enter from the outside of the trough body 53 to cause the battery box 52 to be exposed to the water. However, when the water level of the water 25 in the battery disposition section 24 exceeds a submersion height h1 which is the height of the opening edge 53a, the water 25 in the battery disposition section 24 may enter the battery box 52 to cause the high voltage battery 51 to be exposed to the water. Even when the water level of the water 25 in the battery disposition section 24 does not exceed the submersion height h1, if the water surface of the water 25 in the battery disposition section 24 is inclined by acceleration and deceleration of the electric vehicle V, the water level of the water 25 temporarily exceeds the submersion height h1, and the water 25 in the battery disposition section 24 may enter the battery box 52 to cause the high voltage battery 51 to be exposed to the water.

The water sensor 58 is mounted inside the battery disposition section 24 and outside the battery box 52, for instance, on a front wall surface of the trough body 53. When the water 25 comes into contact with a detector 59, the water sensor 58 transmits a water detection signal to the power drive unit 3, the water detection signal indicating that the water 25 has been detected. Hereinafter, the position at which the detector 59 is provided is also referred to as the detection position of the water sensor 58.

The water sensor 58 is installed in the battery disposition section 24 such that the detection position is higher than a bottom surface 24a, closest to a road surface, of the battery disposition section 24 and lower than the upper end of the battery box 52. More specifically, the detection position of the water sensor 58 is higher than the bottom surface 24a and lower than the submersion height h1 that is the height at which water may enter. Hereinafter, the angle formed by a horizontal plane and the line connecting the detection position of the water sensor 58 and the point P which is of the opening edge 53a and farthest away from the detection position is referred to as the limited angle α. For example, the point P is located farthest away from the detection position in a front-rear direction of the vehicle.

Figure 3:
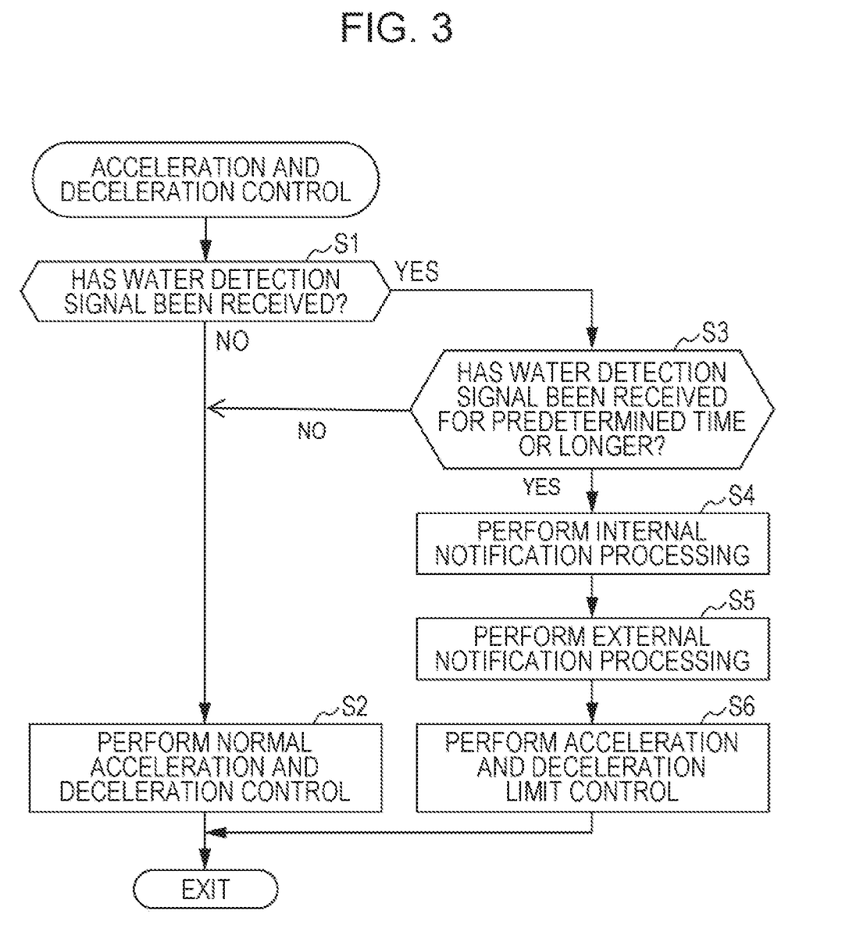
FIG. 3 is a flowchart illustrating the steps of acceleration and deceleration control performed by a power drive unit while an electric vehicle is running.

FIG. 3 is a flowchart illustrating the steps of acceleration and deceleration control performed by the power drive unit 3 while the electric vehicle V is running. The processing illustrated in FIG. 3 is repeatedly performed mainly by the electronic control unit of the power drive unit 3 at every predetermined control period while the vehicle is running.

In S1, the power drive unit 3 determines whether or not a water detection signal has been received from the water sensor 58. When the determination in S1 is NO, the flow proceeds to S2, and when the determination in is YES, the flow proceeds to S3.

In S2, the power drive unit 3 determines that there is no possibility that water may enter the battery box 52, and performs normal acceleration and deceleration control. In the normal acceleration and deceleration control, the power drive unit 3 obtains a driver requested acceleration or a driver requested deceleration of the electric vehicle V made by a driver via the operating pedal 8, controls the acceleration and deceleration of the electric vehicle V so that the driver requested acceleration or the driver requested deceleration is implemented, and completes the processing of FIG. 3. More specifically, electronic control unit of the power drive unit 3 may implement the above control.

In S3, the power drive unit 3 determines whether or not a water detection signal has been received continuously for a predetermined time or longer since a water detection signal is received from the water sensor 58 for the first time. When the determination in S3 is NO, the power drive unit 3 determines that a sufficient amount of water to cause entry of water into the battery box 52 is not accumulated in the battery disposition section 24, and the flow proceeds to S2 to perform the normal acceleration and deceleration control. When the determination in S3 is YES, the power drive unit 3 determines that water in the battery disposition section 24 may enter the battery box 52, and the flow proceeds to S4 to start the acceleration and deceleration control to prevent entry of water into the battery box 52.

In S4, the power drive unit 3 performs internal notification processing. In the internal notification processing, the power drive unit 3 transmits an internal notification command signal to the control device 73 for the display panel 71 and the speaker 72 to notify the driver of the electric vehicle V that the acceleration and deceleration limit control is performed from now or the acceleration and deceleration limit control is in operation. After receiving the internal notification command signal, the control device 73 displays a predetermined notification message on the display panel 71, the notification message indicating that the acceleration and deceleration limit control is to be performed or the acceleration and deceleration limit control is in operation. Alternatively, after receiving the internal notification command signal, the control device 73 causes the speaker 72 to output a predetermined notification message indicating that the acceleration and deceleration limit control is to be performed or the acceleration and deceleration limit control is in operation. It is to be noted that in the internal notification processing, only one of notification via the display panel 71 and notification via the speaker 72 may be performed, or both notification may be performed.

In S5, the power drive unit 3 performs external notification processing. In the external notification processing, the power drive unit 3 transmits an external notification command signal to the control device 75 for the hazard light flasher 74 to notify the driver of the following vehicle of the electric vehicle V that the acceleration and deceleration limit control is performed from now or the acceleration and deceleration limit control is in operation. After receiving the external notification command signal, the control device 75 turns on the hazard light flasher 74 to notify the driver of the following vehicle that the acceleration and deceleration limit control is to be performed or the acceleration and deceleration limit control is in operation.

In S6, the power drive unit 3 performs acceleration and deceleration limit control to limit the acceleration and deceleration of the electric vehicle V in order to prevent entry of water in the battery disposition section 24 into the battery box 52 due to acceleration and deceleration of the electric vehicle V. More specifically, the electronic control unit of the power drive unit 3 may implement the acceleration and deceleration limit control. The electronic control unit may control operation of a braking actuator, an engine braking and a regenerative braking. The electronic control unit may control driving power from the motor generator and from the internal combustion engine.

In the acceleration and deceleration limit control, the power drive unit 3 limits the acceleration and deceleration of the electric vehicle V so that the acceleration or deceleration rate of the electric vehicle V is maintained lower than or equal to a predetermined limited acceleration or deceleration rate. More specifically, in the acceleration and deceleration limit control, the power drive unit 3 obtains a driver requested acceleration or a driver requested deceleration of the electric vehicle V made by a driver via the operating pedal 8. When the driver requested acceleration or the driver requested deceleration is lower than or equal to a predetermined limited acceleration or limited deceleration, similarly to the normal acceleration and deceleration control, the power drive unit 3 controls the acceleration and deceleration of the electric vehicle V so that the driver requested acceleration or the driver requested deceleration is implemented.

Also, when the driver requested acceleration or the driver requested deceleration is higher than the predetermined limited acceleration or limited deceleration, in order to prevent the water in the battery disposition section 24 from being inclined and entering into the battery box 52, the power drive unit 3 controls the acceleration and deceleration of the electric vehicle V so that the limited acceleration or limited deceleration is implemented.

Here, the setting values of the limited acceleration and the limited deceleration in in the acceleration and deceleration limit control will be described. As described with reference to FIG. 2, the water surface of the water in the battery disposition section 24 may be inclined due to acceleration and deceleration of the electric vehicle V, and the water surface may partially exceed a submersion height. It is probable that the higher the acceleration or deceleration of the electric vehicle V, the greater the inclination of the water surface with respect to a horizontal plane. Thus, a correlation between each acceleration or deceleration rate of the electric vehicle V, and the inclination of the water surface of the water in the battery disposition section 24 with respect to a horizontal plane under acceleration or deceleration within the acceleration or deceleration rate is identified by conducting an experiment in advance. Then, the setting values of the limited acceleration and the limited deceleration are set based on the correlation. More specifically, when acceleration or deceleration is performed with the setting values of the limited acceleration and the limited deceleration, let $\beta$ be the inclination of the water surface of the water in the battery disposition section 24, and the setting values of the limited acceleration and the limited deceleration are set so that the inclination $\beta$ is less than or equal to the limited angle $\alpha$ which has been described with reference to FIG. 2.

The vehicle control system 1 according to the embodiment has the following effects.

(1) In the vehicle control system 1, the high voltage battery 51 is stored in the battery box 52, and the battery box 52 is provided in the battery disposition section 24. Also, in response to detection of the water 25 in the battery disposition section 24 by the water sensor 58, the power drive unit 3 limits the acceleration and deceleration of the electric vehicle V so that the acceleration or deceleration rate of the electric vehicle V is maintained lower than or equal to a predetermined limited acceleration or deceleration rate. Thus, when the water 25 enters the battery disposition section 24 of the electric vehicle V while running and the water sensor 58 detects the entering of water, the water level of the water 25 accumulated in the battery disposition section 24 can be stabilized not to be highly ruffled. Consequently, it is possible to prevent the water 25 accumulated in the battery disposition section 24 from entering the battery box 52 due to sudden acceleration and deceleration and to eventually prevent the high voltage battery 51 stored in the battery box 52 from being exposed to water.

(2) In the vehicle control system 1, the water sensor 58 is set at a position higher than the bottom surface 24*a* of the trough-shaped battery disposition section 24. The water sensor 58 detects water when the water level in the battery disposition section 24 exceeds the detection position, and in response to the detection of water by the water sensor 58, the power drive unit 3 performs acceleration and deceleration limit control. In this manner, the vehicle control system 1 performs acceleration and deceleration limit control according to the water level in the battery disposition section 24, thereby making it possible to perform the acceleration and deceleration limit control at an appropriate timing so that the high voltage battery 51 is not exposed to water.

(3) In the vehicle control system 1, the detection position of the water sensor 58 is set to a position higher than the bottom surface 24*a* of the battery disposition section 24. Thus, reduction in the drive performance of the electric vehicle V can be prevented, where the reduction may be caused by performing acceleration and deceleration limit control in a situation in which the water level in the battery disposition section 24 is sufficiently low and there is no risk of exposure of the high voltage battery 51 to water. The detection position of the water sensor 58 is set to a position lower than the upper end of the box-shaped battery box 52. Thus, the acceleration and deceleration limit control can be performed before the water level in the battery disposition section 24 reaches the upper end of the battery box 52 and water enters the battery box 52.

(4) When water is detected continuously for a predetermined time or longer by the water sensor 58, the power drive unit 3 starts the acceleration and deceleration limit control. Thus, acceleration and deceleration limit control can be prevented from accidentally starting in response to temporary exposure of the water sensor 58 to water due to, for instance, acceleration and deceleration of the electric vehicle V even though a sufficient amount of water to cause the high voltage battery 51 to be exposed to water is not accumulated in the battery disposition section 24.

(5) In the vehicle control system 1, a limited acceleration or deceleration rate is set so that inclination of the water surface in the battery disposition section 24 with respect to a horizontal plane is less than or equal to a predetermined limited angle, the inclination being caused when the electric vehicle V is accelerated or decelerated within the limited acceleration or deceleration rate. Thus, it is possible to prevent the angle of the surface of the water in the power storage device disposition section with respect to a horizontal plane from exceeding the limited angle during execution of the acceleration and deceleration limit control. Therefore, it is possible to prevent water from entering the power storage device container due to acceleration and deceleration and to eventually prevent the power storage device from being exposed to water.

(6) In the vehicle control system 1, the battery box 52 includes the trough body 53 in which the high voltage battery 51 is provided, and the lid body 54 which covers the opening edge 53*a* on the vertically upper side of the trough body 53. In this case, the water 25 accumulated in the battery disposition section 24 may enter through the opening edge 53*a* which is space between the trough body 53 and the lid body 54. Thus, in the vehicle control system 1, the limited angle α is formed by a horizontal plane and the line connecting the detection position of the water sensor 58 and the point P which is of the opening edge 53*a* and farthest away from the detection position. Thus, it is possible to reliably prevent the water in the battery disposition section 24 from entering the battery box 52 through the opening edge 53*a* due to acceleration and deceleration of the electric vehicle V during execution of the acceleration and deceleration limit control, and to eventually prevent the high voltage battery 51 from being exposed to water.

(7) When the acceleration and deceleration limit control is performed, a feeling of strangeness may be felt by a driver because the acceleration and deceleration is limited so that the acceleration or deceleration rate of the electric vehicle V is maintained lower than or equal to the limited acceleration or deceleration rate contrary to a request of the driver. Thus, the power drive unit 3 and the control device 73 notify a driver that the acceleration and deceleration limit control is performed via the display panel 71 and/or the speaker 72 before the acceleration and deceleration limit control is performed. Consequently, a feeling of strangeness felt by a driver due to sudden acceleration and deceleration limit control may be reduced. The vehicle control system notifies a driver that the acceleration and deceleration limit control is performed, via at least one of display on the display panel 71 and warning sound or utterance of voice outputted by the speaker 72. Thus, it is possible to reliably notify a driver that the acceleration and deceleration limit control is performed.

(8) When the acceleration and deceleration limit control is performed, a feeling of strangeness may be felt by the driver of the following vehicle because the acceleration and deceleration is limited so that the acceleration or deceleration rate of the vehicle is maintained lower than or equal to the limited acceleration or deceleration rate contrary to a request of the driver of the leading vehicle. Thus, the power drive unit 3 and the control device 75 turn on the hazard light flasher 74 before the acceleration and deceleration limit control is performed. Consequently, a feeling of strangeness felt by the driver of the following vehicle due to sudden acceleration and deceleration limit control may be reduced.

Although an embodiment of the present disclosure has been described above, the present disclosure is not limited to this. For instance, in the embodiment, a case has been described where the water sensor 58 is mounted on a front wall surface of the trough body 53 of the battery box 52. However, the present disclosure is not limited to this. The water sensor 58 may be mounted on a rear wall surface of the trough body 53, for instance. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle comprising:
   a power storage device that stores electric power;
   a power storage device container that stores the power storage device;
   a power storage device disposition chamber in which the power storage device container is provided;
   an acceleration and deceleration control device that controls acceleration and deceleration of a vehicle so that a predetermined request of acceleration and deceleration is implemented; and
   a water sensor provided inside the power storage device disposition chamber, wherein the water sensor detects water which has accumulated in the power storage device disposition chamber, wherein in response to detection of water by the water sensor, the acceleration and deceleration control device performs acceleration and deceleration limit control to limit the acceleration and deceleration of the vehicle so that an acceleration or deceleration rate of the vehicle is maintained lower than or equal to a predetermined limited acceleration or deceleration rate.

2. The vehicle according to claim 1, wherein the power storage device disposition chamber has a trough-shape with a bottom, and the water sensor is installed at a position higher than a bottom surface of the power storage device disposition chamber, and detects water when a water level in the power storage device disposition chamber exceeds a detection position.

3. The vehicle according to claim 2, wherein the power storage device container has a box-shape, and the detection position of the water sensor is higher than the bottom surface and lower than an upper end of the power storage device container.

4. The vehicle according to claim 1, wherein in a case that the water is detected continuously for a predetermined time or longer by the water sensor, the acceleration and deceleration control device starts the acceleration and deceleration limit control.

5. The vehicle according to claim 1, wherein the limited acceleration or deceleration rate is set so that inclination of a water surface in the power storage device disposition chamber with respect to a horizontal plane is less than or equal to a predetermined limited angle, the inclination being caused when the vehicle is accelerated or decelerated with the limited acceleration or deceleration rate.

6. The vehicle according to claim 5, wherein the power storage device container includes a trough body which has a bottom and includes the power storage device, and the power storage device container includes a lid body which covers an opening edge of the trough body, the opening edge disposed on a vertically upper side of the trough body, a detection position of the water sensor is higher than the bottom surface and lower than the opening edge, and the limited angle is formed by a horizontal plane and a line connecting the detection position of the water sensor and a point which is on the opening edge and farthest away from the detection position.

7. The vehicle according to claim 1, further comprising an internal notification control device that notifies to a driver that the acceleration and deceleration limit control is performed before the acceleration and deceleration limit control is performed by the acceleration and deceleration control device.

8. The vehicle according to claim 7, wherein the internal notification control device notifies to the driver that the acceleration and deceleration limit control is performed, via at least one of (i) display on a meter recognizable by visual perception of the driver and (ii) warning sound or utterance of voice recognizable by auditory perception of the driver.

9. The vehicle according to claim 1, further comprising an external notification control device that turns on a hazard light flasher before the acceleration and deceleration limit control is performed by the acceleration and deceleration control device.

10. The vehicle according to claim 1, wherein the acceleration and deceleration control device performs the acceleration and deceleration limit control to limit the acceleration and deceleration of the vehicle which is requested by the predetermined request.

11. The vehicle according to claim 1, wherein the water sensor is a water level sensor which detects a level of the water stored in the power storage device disposition chamber.

12. The vehicle according to claim 6, wherein the power storage device disposition chamber has a trough-shape with a bottom, and the water sensor is installed at a position higher than a bottom surface of the power storage device disposition chamber, and the point is located farthest away from the detection position in a front-rear direction of the vehicle.

13. A vehicle control method of a vehicle, the vehicle comprising a power storage device that stores electric power; a power storage device container that stores the power storage device; a power storage device disposition chamber in which the power storage device container is provided; and an acceleration and deceleration control device that controls acceleration and deceleration of a vehicle so that a predetermined request of acceleration and deceleration is implemented, the method comprising steps of:

detecting by a water sensor water in the power storage device disposition chamber, wherein the water sensor is provided inside the power storage device disposition chamber, and the water sensor detects water which has accumulated in the power storage device disposition chamber; and in response to detection of the water by the water sensor, performing by the acceleration and deceleration control device an acceleration and deceleration limit control to limit the acceleration and deceleration of the vehicle so that an acceleration or deceleration rate of the vehicle is maintained lower than or equal to a predetermined limited acceleration or deceleration rate.

14. A vehicle control device of a vehicle, wherein the vehicle comprises a power storage device that stores electric power, a power storage device container that stores the power storage device, a power storage device disposition chamber in which the power storage device container is provided, and a water sensor that detects water in the power storage device disposition chamber, wherein the vehicle control device is configured to perform:

an acceleration and deceleration control that controls acceleration and deceleration of a vehicle so that a predetermined request of acceleration and deceleration is implemented, and an acceleration and deceleration limit control that, in response to detection of water by the water sensor, limits the acceleration and deceleration of the vehicle so that an acceleration or deceleration rate of the vehicle is maintained lower than or equal to a predetermined limited acceleration or deceleration rate, wherein the water sensor is provided inside the power storage device disposition chamber, and the water sensor detects water which has accumulated in the power storage device disposition chamber.

* * * * *